(12) United States Patent
Fujimura

(10) Patent No.: US 8,712,917 B2
(45) Date of Patent: Apr. 29, 2014

(54) SOFTWARE EXECUTION MANAGEMENT APPARATUS, METHOD, AND COMPUTER-READABLE MEDIUM THEREOF

(75) Inventor: Kouji Fujimura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1298 days.

(21) Appl. No.: 12/215,415

(22) Filed: Jun. 27, 2008

(65) Prior Publication Data

US 2008/0271162 A1     Oct. 30, 2008

Related U.S. Application Data

(63) Continuation of application No. PCT/JP2005/024132, filed on Dec. 28, 2005.

(51) Int. Cl.
*G06Q 99/00*     (2006.01)

(52) U.S. Cl.
USPC .............. 705/59; 705/50; 705/51; 709/223; 713/153; 718/100; 718/101; 718/102; 718/103; 718/104

(58) Field of Classification Search
USPC ............... 705/50, 51, 59; 709/223; 713/153; 718/100–104
See application file for complete search history.

(56) References Cited

U.S. PATENT DOCUMENTS

| 5,940,504 | A | 8/1999 | Griswold |
| 6,009,401 | A | 12/1999 | Horstmann |
| 6,223,291 | B1 | 4/2001 | Puhl et al. |
| 7,073,073 | B1 | 7/2006 | Nonaka et al. |
| 7,137,114 | B2 * | 11/2006 | Rich et al. ................ 717/174 |
| 7,203,966 | B2 * | 4/2007 | Abburi et al. ................ 726/29 |
| 7,716,348 | B1 * | 5/2010 | Redding et al. .............. 709/229 |
| 2002/0013772 | A1 | 1/2002 | Peinado |
| 2002/0129262 | A1 | 9/2002 | Kutaragi et al. |
| 2003/0084306 | A1 * | 5/2003 | Abburi et al. ................. 713/188 |
| 2004/0117467 | A1 * | 6/2004 | Rich et al. ..................... 709/223 |
| 2006/0085350 | A1 * | 4/2006 | Samayamantry et al. ...... 705/59 |

FOREIGN PATENT DOCUMENTS

| JP | 6-223040 | 8/1994 |
| JP | 2000-200195 | 7/2000 |
| JP | 2000-207199 | 7/2000 |
| JP | 2002-182763 | 6/2002 |
| JP | 2004-135325 | 4/2004 |
| KR | 2001-0109268 | 12/2001 |

OTHER PUBLICATIONS

Extended European Search Report issued Jun. 22, 2011 in European Application No. EP 05844879 (5 pages).

* cited by examiner

*Primary Examiner* — James D Nigh
(74) *Attorney, Agent, or Firm* — Staas & Halsey LLP

(57) ABSTRACT

Even if the process for permitting execution of software is enabled in accordance with first license information, upon transmitting an invalidation signal from the invalidation signal transmitter 116, the execution of the process for permitting execution of software is limited in accordance with second license information. Thus, the invalidation signal can limit the execution of the process for permitting execution of software in accordance with specific license information and the execution of the licensed software without fail.

12 Claims, 13 Drawing Sheets

FIG. 3A

| MAC ADDRESS OF MACHINE FOR REGISTRATION | LICENSE INFORMATION TO BE PROVIDED | NUMBER OF REGISTERED OLD SERVERS | MAC ADDRESSES OF OLD SERVERS... |
|---|---|---|---|
| | | | |

FIG. 3B

| LICENSE SERVICE ABORT FLAG |
|---|
| IP ADDRESS OF TRANSMISSION SOURCE MACHINE |
| HOST NAME OF TRANSMISSION SOURCE MACHINE |
| MAC ADDRESS OF OLD SERVER TO BE ABORTED |
| LICENSE INFORMATION TO BE ABORTED |
| |
| |

FIG. 3C

| LICENSE ABORT FLAG |
|---|
| HOST NAME OF AVAILABLE LICENSE SERVER |
| IP ADDRESS OF AVAILABLE LICENSE SERVER |

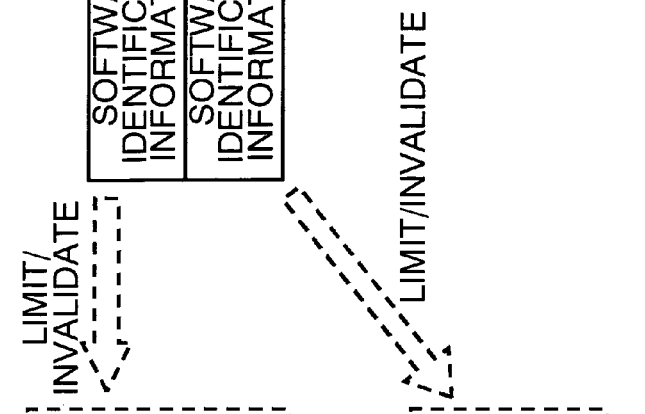

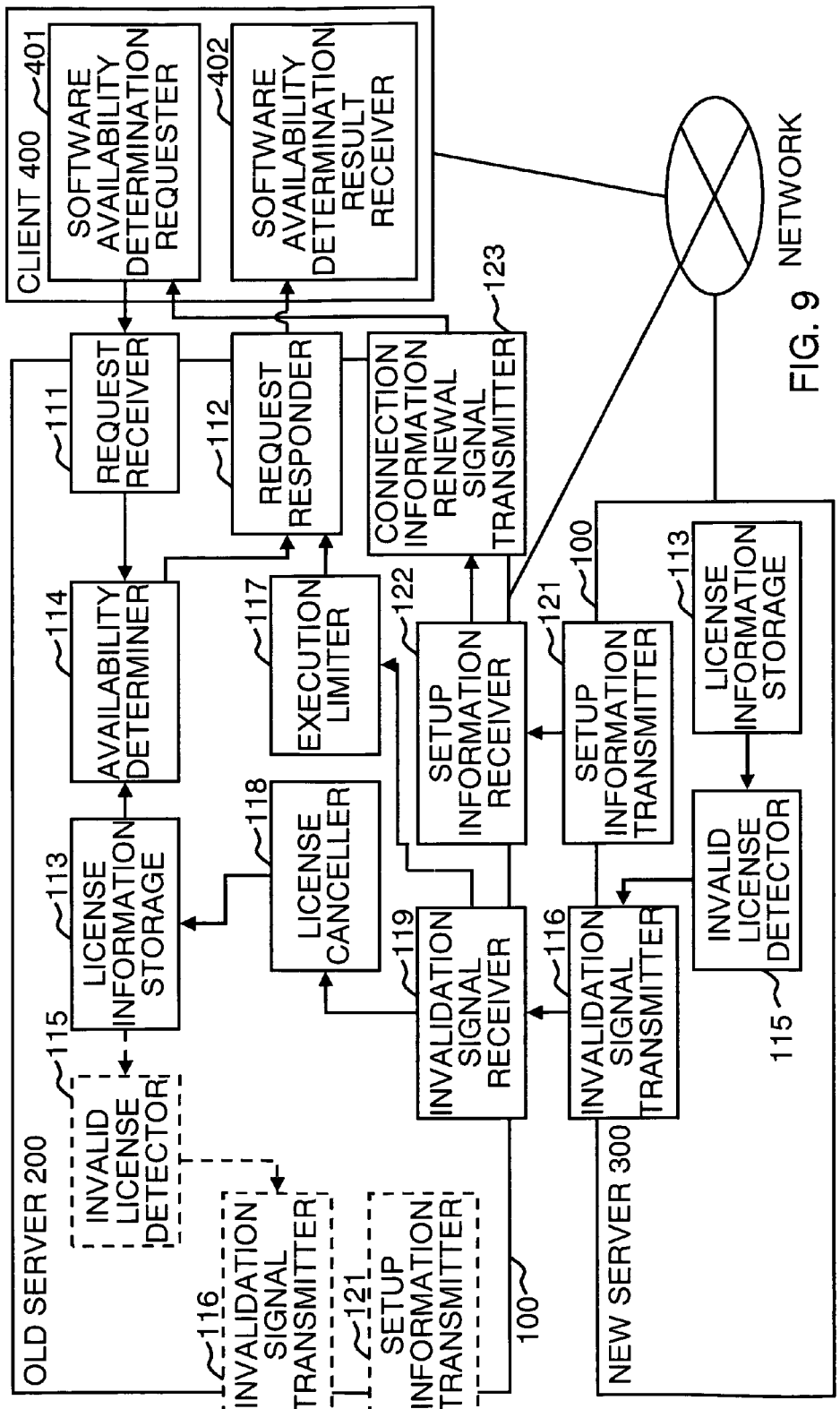
FIG. 9 NETWORK

| MAC ADDRESS OF MACHINE FOR REGISTRATION | LICENSE INFORMATION TO BE PROVIDED | NUMBER OF REGISTERED OLD SERVERS | MAC ADDRESSES OF OLD SERVERS... |
|---|---|---|---|

| | MAC ADDRESS OF OLD SERVER | ABORT INFORMATION TRANSMITTED FLAG |
|---|---|---|
| 1 | | |
| 2 | | |
| 3 | | |

FIG. 11A

| MAC ADDRESSES OF MACHINES FOR REGISTRATION | LICENSE INFORMATION TO BE PROVIDED | NUMBER OF REGISTERED OLD SERVERS | MAC ADDRESS OF OLD SERVER... |
|---|---|---|---|

| | MAC ADDRESS OF MACHINE FOR REGISTRATION | ABORT INFORMATION TRANSMITTING FLAG |
|---|---|---|
| 1 | | |
| 2 | | |
| 3 | | |

| MAC ADDRESSES OF MACHINES FOR REGISTRATION | LICENSE INFORMATION TO BE PROVIDED | NUMBER OF REGISTERED OLD SERVERS | MAC ADDRESS OF OLD SERVER... |
|---|---|---|---|
| 1 | MAC ADDRESS OF MACHINE FOR REGISTRATION | | |
| 2 | MAC ADDRESS OF MACHINE FOR REGISTRATION | | |
| 3 | MAC ADDRESS OF MACHINE FOR REGISTRATION | | |

FIG. 12B

| MAC ADDRESSES OF MACHINES FOR REGISTRATION | LICENSE INFORMATION TO BE PROVIDED | ABORT INFORMATION TRANSMISSION ID | NUMBER OF REGISTERED OLD SERVERS | MAC ADDRESSES OF OLD SERVERS... |
|---|---|---|---|---|
| 1 | MAC ADDRESS OF MACHINE FOR REGISTRATION | ABORT INFORMATION TRANSMISSION ID | | |
| 2 | MAC ADDRESS OF MACHINE FOR REGISTRATION | ABORT INFORMATION TRANSMISSION ID | | |
| 3 | MAC ADDRESS OF MACHINE FOR REGISTRATION | ABORT INFORMATION TRANSMISSION ID | | |

| | MAC ADDRESS OF OLD SERVER | ABORT INFORMATION TRANSMITTED FLAG |
|---|---|---|
| 1 | MAC ADDRESS OF OLD SERVER | ABORT INFORMATION TRANSMITTED FLAG |
| 2 | MAC ADDRESS OF OLD SERVER | ABORT INFORMATION TRANSMITTED FLAG |
| 3 | MAC ADDRESS OF OLD SERVER | ABORT INFORMATION TRANSMITTED FLAG |

SOFTWARE EXECUTION MANAGEMENT APPARATUS, METHOD, AND COMPUTER-READABLE MEDIUM THEREOF

This application claims the benefit under 35 U.S.C. Section 371 and is a continuation of PCT International Application Number PCT/JP2005/024132, filed Dec. 28, 2005 in Japan, the contents of which are incorporated herein by reference.

BACKGROUND

1. Field

The present invention relates to a software execution management apparatus that limits, in accordance with a license, execution of a process for permitting execution of software. In particular, the present invention relates to a software execution management apparatus, a software execution management method, and a software execution management program for invalidating a license after granted for permitting use of a program.

2. Description of the Related Art

Upon selling software, a license that permits use of the software is generally granted to a buyer. Further, upon launching the software, illegal use is prevented by controlling availability of a program included in the software in accordance with contents of the granted license.

However, there is a problem that illegal use beyond the contents of the license at the time of a contract can be performed by copying the license.

Japanese Laid-open Patent Publication No. 2000-207199 discloses a license management method in which a software usage code generated from a machine identification code unique to each computer is granted upon licensing and the consistency is checked between the software usage code and the machine identification code of a computer the software is launched thereon upon checking the license. According to this management method, illegal use beyond the contents of the license at the time of the contract is prevented by invalidating a copied license in a computer other than the licensed computer upon checking the license.

Japanese Laid-open Patent Publication No. 2002-182763 discloses a network license management method in which licenses are not individually granted to each computer but managed in an integrated fashion by a license management server. According to this management method, illegal use beyond the contents of the license at the time of the contract is prevented by controlling permission of use of the software in accordance with whether the licensed number is within the contracted number when an arbitrary machine in a network requests a license for using the software. Herein, the contents of the license include a limit of the number of computers concurrently using the software, limit of duration of service, and limit of the number of concurrent users in a multi-user system.

When one computer which is granted a license generated from a machine identification code unique to each computer needs to be replaced with another computer because of failure or aging of the computer granted the license, it is required to issue a license generated from the machine identification code of the other computer. In this case, such a sales system is considered that the new license is granted for substantially free or lower charge than that of the first license under a condition for canceling the first license, instead of the same charge as that of the first license. However, there is no technical means for forcedly invalidating the old license upon issuing a new license. It is disadvantageous that the software can be used on both the computer granted the old license and the computer granted the new license.

Also in the method of managing licenses in an integrated fashion in a license management server, it is needed to grant a license generated from the machine identification code of the computer as the license management server to prevent copy of the license management server itself. Thus, the above described disadvantage is caused when the computer as the license management server needs to be replaced with another computer because of failure or aging.

In particular, upon establishing a server including a license management server, a single server may be virtually established by a plurality of computers for the purpose of load distribution. In this case, upon permitting the execution of server software, a license generated from a machine identification code unique to each computer is granted for every computer constituting the server. When one of the computers is replaced, there are computers executed under the old license and a computer executed under the new license. It is disadvantageous in view of performance to verify whether or not the old and new licenses are valid only by comparing versions of the licenses between a plurality of computers constituting the server. In order to avoid this disadvantage, it is required to reissue the license to all computers constituting the server even when replacing only one computer. It is also disadvantageous in view of operation. Furthermore, immediate invalidation of the old license upon issuing the new license is disadvantageous for a user of a client accessing to the server.

Herein, the "disadvantage in operation" includes that on the provider side due to the operation for reissuing the licenses for all computers constituting the server and that on the user side due to the operation for registering the reissued license.

The "disadvantage for a user of a client" includes that of inaccessibility of the client user to the server for a period of shifting from the old server to the new server and that of occurrence of operation for changing the access destination from the old server to the new server.

SUMMARY

In order to solve the above described disadvantages, it is an object of the present invention to provide a software execution management apparatus in which the old license required to be canceled is forcedly invalidated by issuing a new license.

According to an aspect of the present invention, there is provided a software execution management apparatus. The software execution management apparatus includes a license information storage, an availability determiner, an invalid license detector, an invalidation signal transmitter, and an execution limiter.

The license information storage stores first license information which is relating to contents for permitting execution of a process for permitting execution of software and second license information which includes an identification code for identifying a license required invalidation. The availability determiner determines, in accordance with the first license information, availability of the process for permitting execution of software. The invalid license detector detects, in accordance with the second license information, another software execution management apparatus that executes a process for permitting execution of software which is permitted to be executed, wherein the software is permitted in accordance with the license required invalidation, by the availability determiner, to be executed. The invalidation signal transmitter transmits an invalidation signal for limiting the process for permitting execution of software which is detected by the invalid license detector. The execution limiter limits the process for permitting execution of software, regardless of the first license information, upon receiving the invalidation signal.

The second license information in the software execution management apparatus may mainly include an identification code that identifies the license required invalidation in another software execution management apparatus.

The software execution management apparatus may further include a license canceller that registers information for invalidating the first license information in the license information storage upon receiving the invalidation signal.

The software execution management apparatus may further include a request receiver and a request responder. The request receiver receives from a client a request for executing the process for permitting execution of software. The request responder executes the process for permitting execution of software upon receiving from the client the request for executing the process for permitting execution of software and returns a result thereof to the client. The execution limiter limits execution of the request responder upon receiving the invalidation signal.

The software execution management apparatus may further include a setup information transmitter, a setup information receiver, and an access information renewal signal transmitter.

The setup information transmitter transmits, upon transmitting the invalidation signal for limiting the process for permitting execution of software which is detected by the invalid license detector, setup information which is relating to an access to the request receiver. The setup information receiver receives the setup information from the setup information transmitter upon receiving the invalidation signal. The access information renewal signal transmitter transmits to the client an access information renewal signal for instructing retransmission of a request for processing to the request receiver which is specified in the setup information which is received by the setup information receiver, upon receiving by the request receiver the request for executing the process for permitting execution of software from the client after receiving the invalidation signal.

The outline of the present invention discussed above is not intended to mean an essential combination of features for the present invention, and the present invention may cover the sub-combination of the plurality of the features.

BRIEF DESCRIPTION OF THE DRAWINGS

FIGS. 3A, 3B, and 3C are diagrams illustrating data used in a software execution management system according to a first embodiment of the present invention;

FIGS. 4A, 4B, and 4C are diagrams illustrating first license information and second license information used in a software execution management system according to a first embodiment of the present invention;

FIG. 9 is a block diagram illustrating details of a license server according to a second embodiment of the present invention;

FIGS. 11A and 11B are diagrams illustrating data used in a software execution management system according to other embodiments of the present invention;

FIGS. 12A and 12B are diagrams illustrating data used in a software execution management system according to other embodiments of the present invention.

DESCRIPTION OF THE PREFERRED EMBODIMENTS

Figure 1:
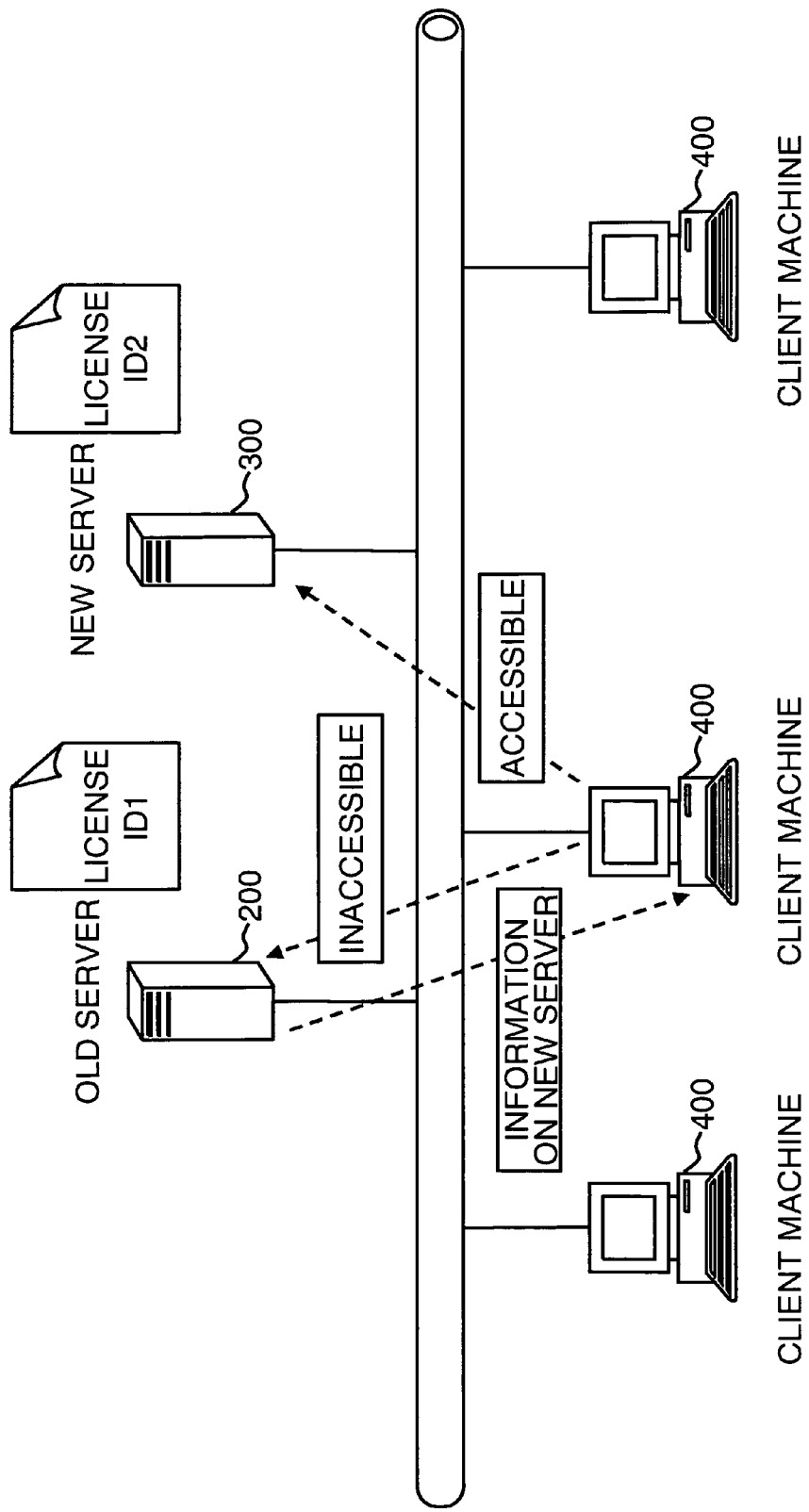
FIG. 1 is a diagram illustrating an entire system structure of a software execution management system according to a first embodiment of the present invention.

Herein, the present invention may be variously embodied. Therefore, the present invention is not limited to the following description of embodiments. Like reference numerals refer to like components through out the embodiments.

Though the embodiments will be mainly described as systems, as will be apparent to those skilled in the art, the present invention may be embodied as a method or a program available by a computer. The present invention may be embodied in hardware, software, or both software and hardware. The program may be recorded in an arbitrary computer-readable medium such as a hard disk, CD-ROM, DVD-ROM, optical memory device, and magnetic memory device. The program may be recorded in another computer over a network.

First Embodiment

A description will be given on a software execution management system according to a first embodiment of the present invention with reference to the drawings.

Figure 2:
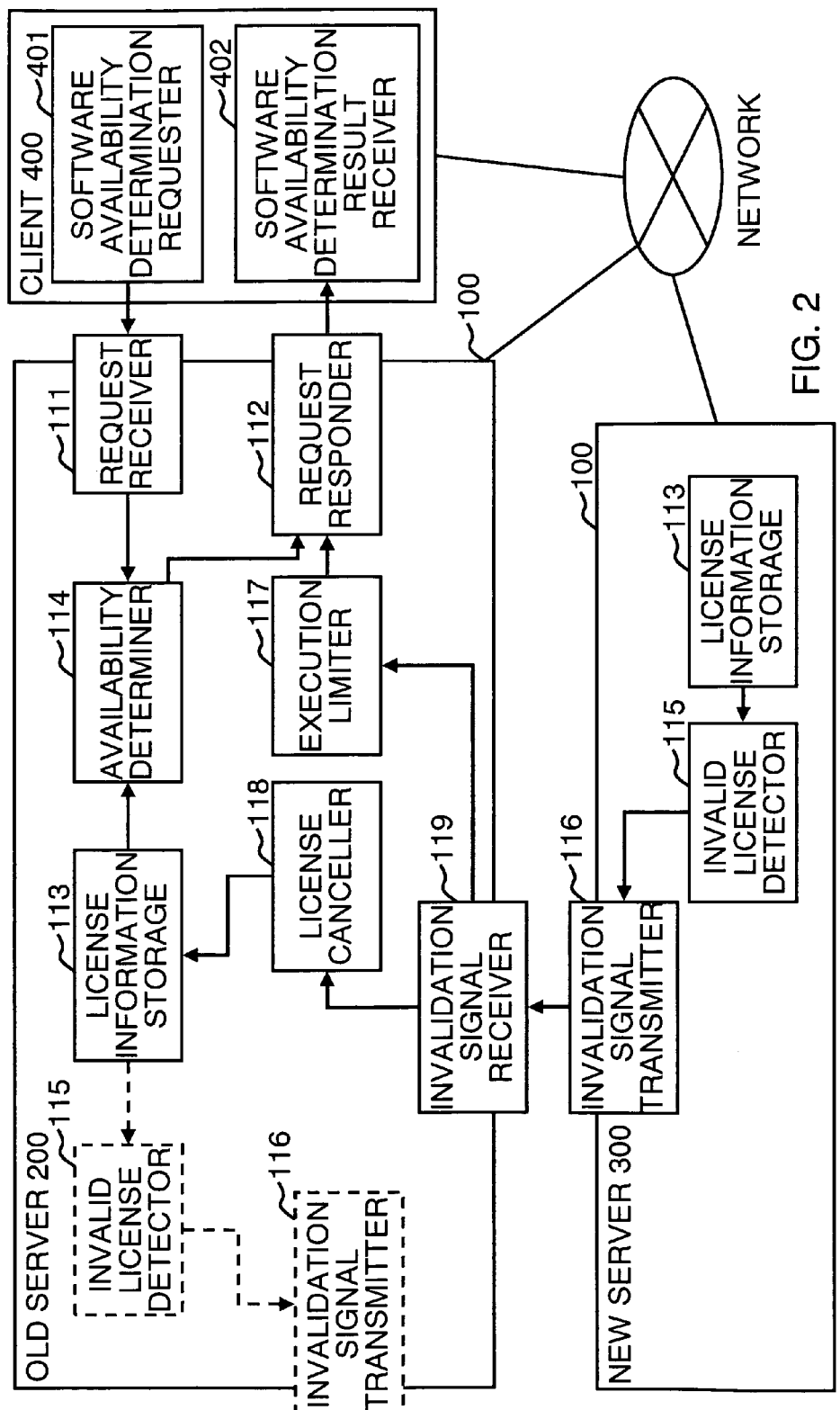
FIG. 2 is a block diagram illustrating details of a license server according to a first embodiment of the present invention.

FIG. 1 is a diagram illustrating an entire system structure of a software execution management system according to the first embodiment. FIG. 2 is a block diagram illustrating details of a license server according to the first embodiment.

The software execution management system includes a client 400 that requests permission of execution of licensed software, and a license server 100 that executes license determination process for determining availability of the requested software in response to a request from the client 400 in accordance with the first license information, and gives the client 400 a result of software availability determination. In particular, the license server 100 limits execution of the pertinent license determination process in accordance with an invalidation signal received from another license server 100, regardless of the first license information.

Both an old server 200 and a new server 300 shown in FIG. 1 are the license servers 100. The old server 200 is built on an aging computer, and the server shifts from the old server 200 to the new server 300 on a new computer including high performance for the purpose of obtaining a higher response. The old server 200 may coexist with the new server 300 only for a shifting period of the server, or may continue to be used as the license server 100. Specifically, such a case is that, as the load of the old server 200 so far processing licenses of software A and B becomes larger, the new server 300 manages the software B and the old server 200 manages the software A as usual.

In FIG. 2, the new server 300 includes only a license information storage 113, an invalid license detector 115, and an invalidation signal transmitter 116 that are a part of the license server 100, as will be described later. However, similarly to the old server 200, the new server 300 also has other components that are omitted in FIG. 2 for the purpose of a convenience. In a description of operation according to the first embodiment, the invalid license detector 115 and the invalidation signal transmitter 116 in the new server 300 are executed and the invalid license detector 115 and the invalidation signal transmitter 116 in the old server 200 are not executed. Therefore, the invalid license detector 115 and the invalidation signal transmitter 116 on the old server 200 and arrows connected thereto are shown by dotted lines.

The license server 100 includes: a request receiver 111; a request responder 112; a license information storage 113; an availability determiner 114; an invalid license detector 115; an invalidation signal transmitter 116; an execution limiter 117; a license canceller 118; and an invalidation signal receiver 119.

The request receiver 111 receives from the client a request for executing the license determination process.

Upon receiving from the client the request for executing the license determination process, the request responder 112 executes the license determination process, and returns a result thereof to the client.

The license information storage 113 stores first license information relating to contents for permitting execution of the license determination process and second license information including an identification code for identifying the license required invalidation.

The availability determiner 114 determines, in accordance with the first license information, availability of the license determination process.

The invalid license detector 115 detects, in accordance with the second license information, another license server 100 that executes the license determination process whose execution is permitted by the availability determiner 114 in accordance with the license required invalidation.

The invalidation signal transmitter 116 transmits the invalidation signal that limits execution of the license determination process detected by the invalid license detector.

The execution limiter 117 limits the execution of the license determination process regardless of the first license information, upon receiving the invalidation signal.

The license canceller 118 registers information that invalidates the first license information in the license information storage, upon receiving the invalidation signal.

The client 400 includes a software availability determination requester 401 and a software availability determination result receiver 402.

The software availability determination requester 401 requests, to the license server 100, determination on availability of the software.

The software availability determination result receiver 402 receives from the license server 100 a result of software availability determination.

FIGS. 3A, 3B, and 3C are diagrams illustrating data used in a software execution management system according to the first embodiment.

FIG. 3A shows a data structure of a license ID. A license ID includes: MAC (Media access Control) Address of Computer for Registration of the license ID; License Information; Number of Registered Old Servers, that is, the number of the license servers to be replaced; and MAC Addresses of Old Servers (in order to limit and invalidate a function of a part of the software managed by the license server on the old server 200, identification information of software to be limited or invalidated is required as well as the information for identifying the old server). The License Information includes: Software Identification Information for identifying the licensed software; and Number of Clients that may execute the licensed software.

FIG. 3B shows a data structure of abort information, that is, the invalidation signal transmitted from the new server 300 as the license server 100 after the replacement to the old server 200 as the license server 100 before replacement. The abort information includes: License Service Abort Flag indicating the abort information; IP Address of Transmission Source Machine; Host Name of Transmission Source Machine; MAC Address of Old Server to be Aborted; and License Information to be Aborted.

FIGS. 4A, 4B, and 4C show examples of the first license information and the second license information used in a software execution management system according to the first embodiment. The first license information has attributes of Software Identification Information and IP Address for identifying the client 400. By using the IP address, the client 400 is not only identified but also enabled to communicate. The second license information has an attribute of Software Identification Information. The first license information may also have only an attribute of Software Identification Information. In this situation, upon managing a plurality of licensed software, it is required to hold, for each of the software, information for identifying the client that currently executes the software, as additional information for the license determination process.

In the first license information shown in FIG. 4B, Software Identification Information is related to IP Address. Herein, a row not related to an IP Address but to "NULL" indicates that the software identified by Software Identification Information is available. That is, there is room to issue or lend to the client the use permission of the software identified by the pertinent Software Identification Information.

The second license information shown in FIG. 4C has information relating to the license required invalidation. As shown by the dotted arrow, the second license information, shown in FIG. 4C, of the new server 300 indirectly limits process for the software specified in the first license information, shown in FIG. 4B, of the old server 200, or invalidates the first license information itself.

According to the first embodiment, an MAC address is used as the information for identifying the computer on which the license server 100 is built. Other information such as an IP address may be used for identifying the license server 100 or the computer. Since an MAC address is given to a LAN card 16 by a manufacturer at the time of shipment from a factory and cannot be changed later by a user, an MAC address is more preferable as compared to information such as the IP address that can be changed. That is, in case of using an IP address instead of an MAC address, changing the IP address given to the computer constituting the old server 200 causes the new server 300 to be disable to communicate with the old server 200. Therefore, convenient information such as an IP address may be preferably used together with an MAC address that cannot be changed.

Figure 5:
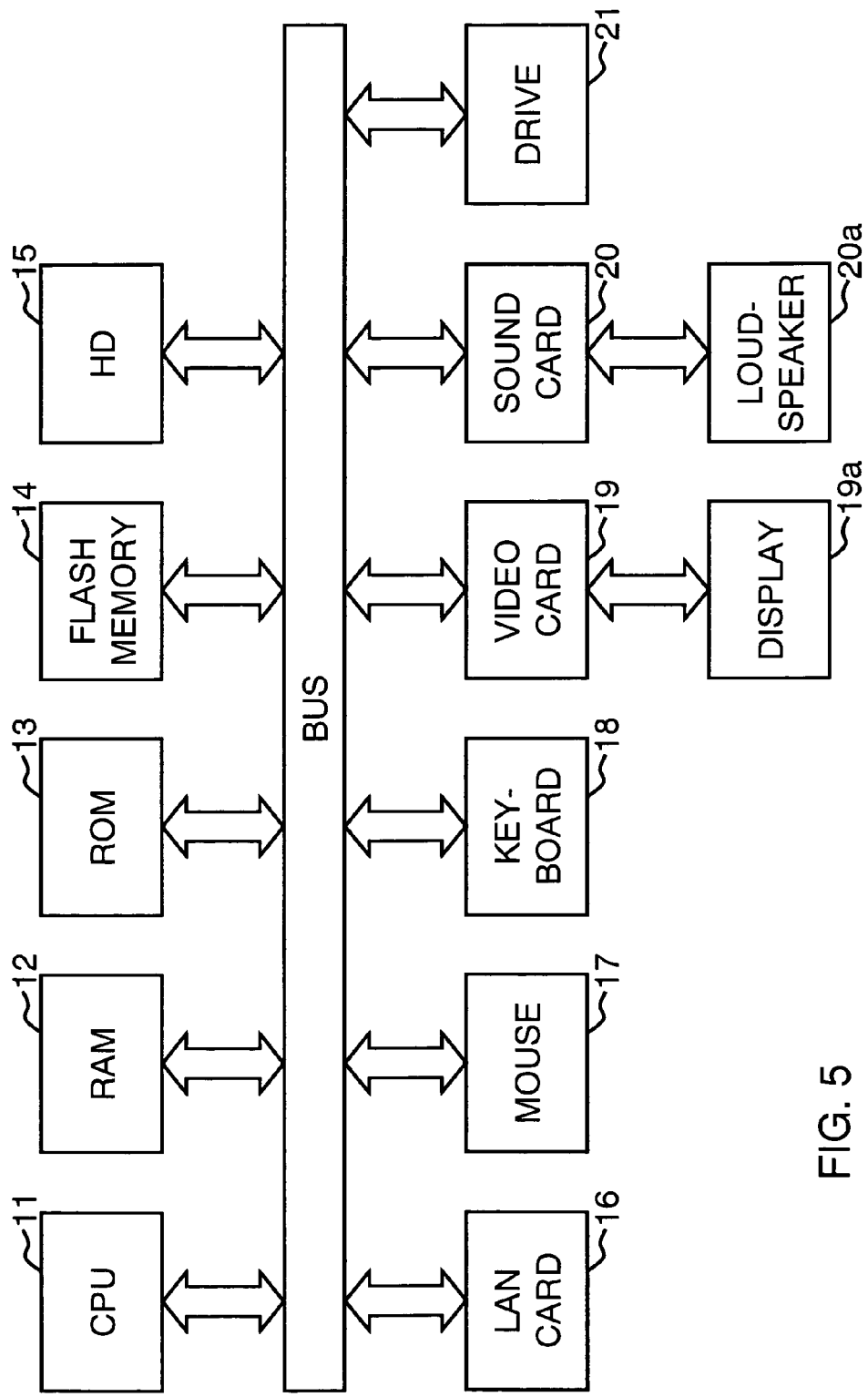
FIG. 5 is a diagram illustrating a hardware structure of a computer constituting a license server and/or a client according to a first embodiment of the present invention.

FIG. 5 is diagram illustrating a hardware structure of a computer constituting a license server and/or a client according to the first embodiment.

The computer constituting the license server 100 and/or the client 400 includes: a CPU (Central Processing Unit) 11; a RAM (Random Access Memory) 12; a ROM (Read Only Memory) 13; a flash memory 14; an HD (Hard Disk) 15 serving as an external storage device; a LAN (Local Area Network) card 16; a mouse 17; a keyboard 18; a video card 19; a display 19a as a display device that is electrically connected to the video card 19; a sound card 20; a loudspeaker 20a as a sound output device that is electrically connected to the sound card 20; and a drive 21 that writes/reads data in a storage medium such as a floppy disk, CD-ROM, and DVD-ROM.

The license server 100 is realized by reading a software execution control program stored in advance in the HD 15 in a computer to a main memory and executing the software execution control program by the CPU 11.

Figure 6:
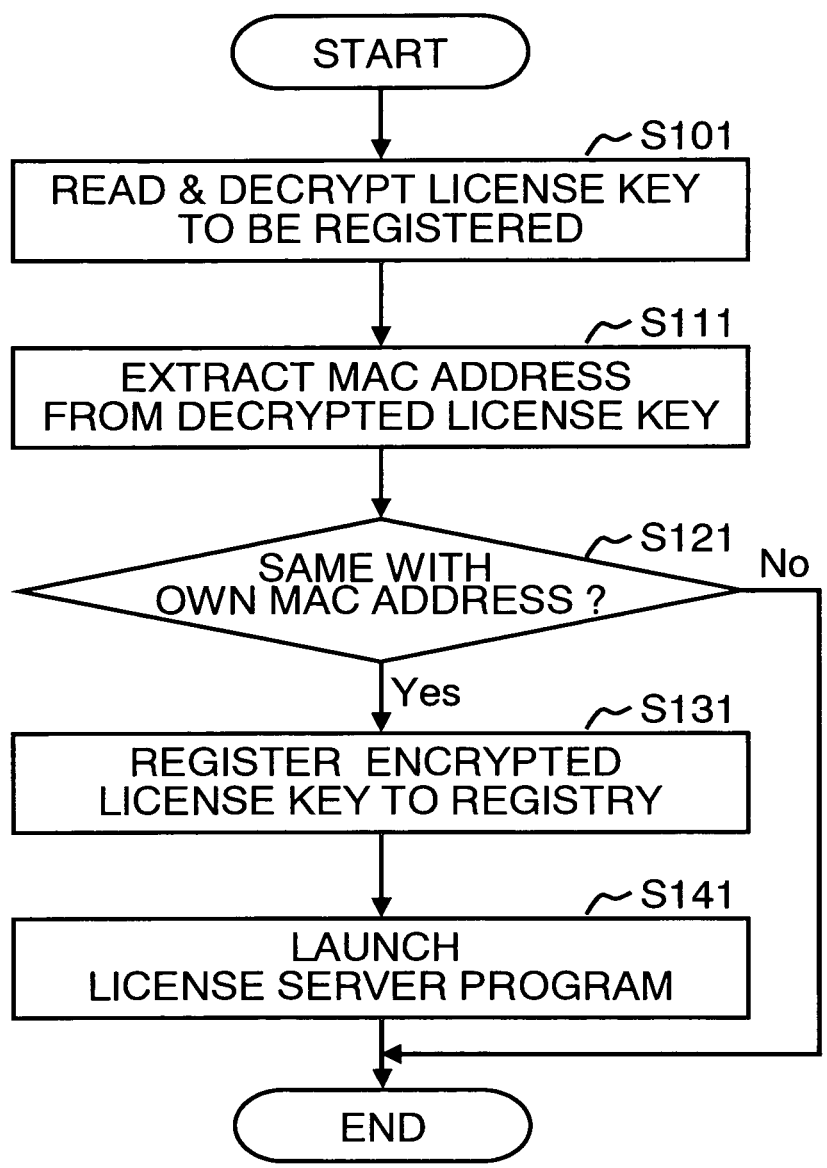
FIG. 6 is a flowchart of a license registration process in a new server according to a first embodiment of the present invention.

FIG. 6 is a flowchart of a license registration process in a new server according to the first embodiment.

A system operator receives in advance an encrypted license ID encrypted by a license management company. For example, the encrypted license ID is received via E-mail. When the system operator inputs the encrypted license ID to the new server 300, the new server 300 reads and decrypts the encrypted license ID (in step S101). The new server 300 extracts an MAC address from the decrypted license ID (in step S111). The new server 300 determines whether or not the MAC address held by the computer constituting the new server 300 matches the MAC address extracted in step S111 (in step S121). In case of a mismatching, the license is not registered and the process ends. In case of a matching, the encrypted license ID is registered to a registry (in step S131). Herein, the registry is a database for recording setup data of software on the OS (Operation System) of WINDOWS®. Subsequently to step S131, the new server 300 starts to receive a request for processing the registered license (in step S141). That is, the new server 300 reads the program of the license determination process in accordance with the first license information registered in the registry, thereby entering a state in which the new server 300 can respond to a request for permitting execution of the software from the client 400. Incidentally, the program of the license determination process may not be immediately read after step S141 but it may be determined, upon receiving the request for permitting execution from the client 400, whether or not the request for permitting execution satisfies a predetermined condition and the program of the license determination process may be read in accordance with the determination result. More specifically, when determining that the software specified in the request for permitting execution is the software specified in the first license information as to be licensed, the program of the license determination process may be read. Whether or not the software specified in the request for permitting execution from the client is the software specified in the first license information as to be licensed may be determined by comparing Software Identification Information included in the request for permitting execution transmitted by the client with Software Identification Information included in the first license information.

The license determination process will be described later.

The encrypted license ID has not only the license information but the invalidation information and, in effect, holds the first license information and the second license information.

Figure 7:
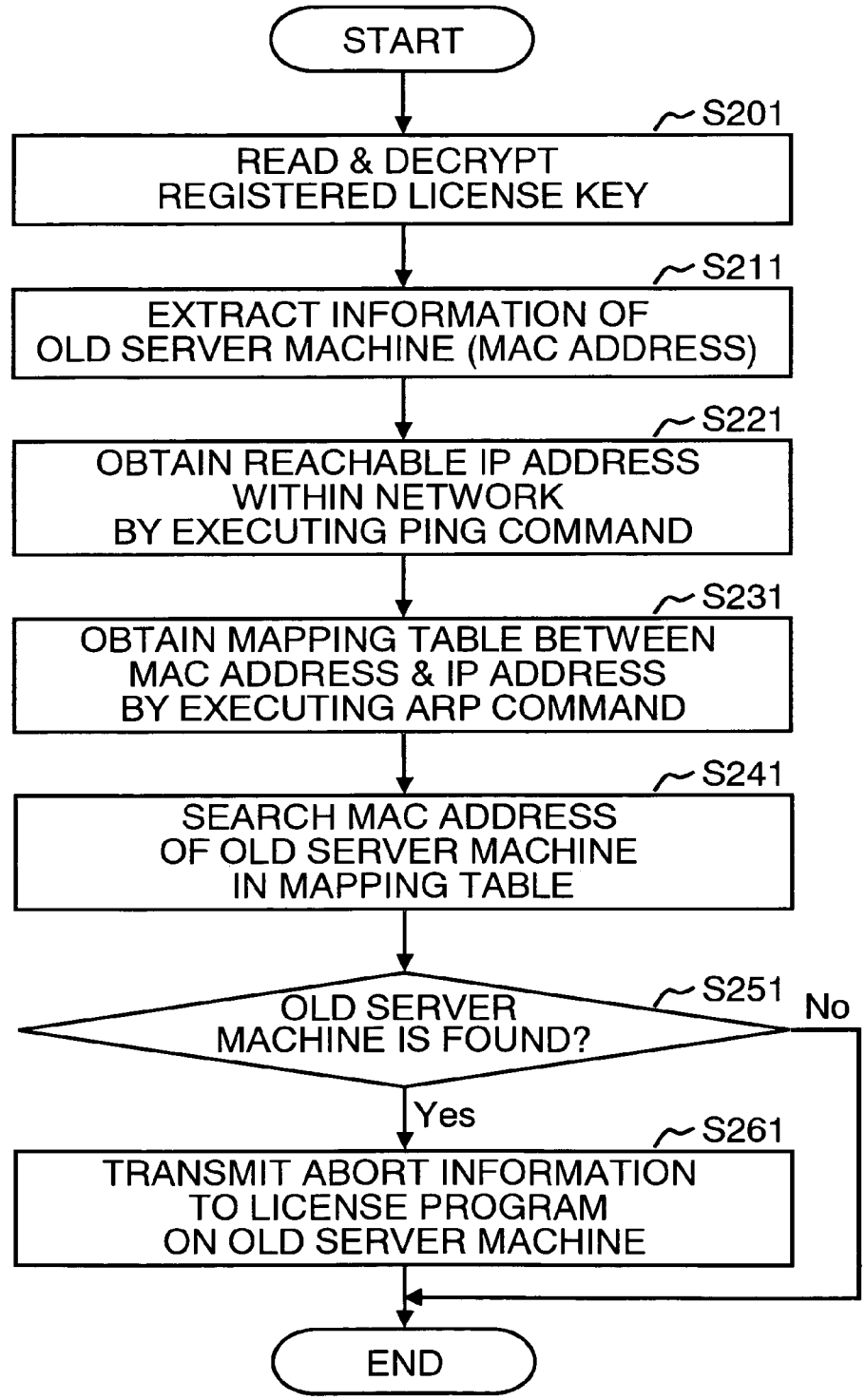
FIG. 7 is a flowchart of an abort information transmission process in a new server according to a first embodiment of the present invention.

FIG. 7 is a flowchart of an abort information transmission process in a new server according to the first embodiment.

The new server 300 reads and decrypts the encrypted license ID registered as mentioned above from the registry (in step S201). The new server 300 extracts the MAC address of the old server 200 from the decrypted license ID (in step S211). Subsequently, the new server 300 performs a communication establishment sequence on the basis of the MAC address of the old server 200 so as to be reachable to the computer constituting the old server 200. Thereafter, the abort information is transmitted from the new server 300 (invalidation signal transmitter 116) to the old server 200 (in step S261).

According to the first embodiment, since an MAC address is used as information for identifying a computer constituting a license server 100, the following process, e.g., is required in order to be reachable to the computer constituting the old server 200.

The new server 300 executes PING (Packet INternet Groper) to another node in a network domain thereof on the basis of the network information (IP address and network address) thereof (in step S221). An IP address consists of two parts: a network address part and a host address part. Since the network address parts of nodes in the same network domain have the same address value, it is well-known for a person skilled in the art that estimation on the IP address of another node in the network domain thereof may be performed by modifying only the host address part. With PING, by specifying an IP address, data is transmitted to a computer corresponding to the specified IP address by using ICMP (Internet Control Message Protocol), and return data from the computer is received. The new server 300 executes ARP (Address Resolution Protocol) for the IP address from which the return data is received, and obtains a mapping table between the MAC address and the IP address (in step S231). With ARP, an MAC address is obtained by specifying an IP address. The MAC address of the old server 200 is searched in the mapping table (in step S241). It is determined whether or not the MAC address of the old server 200 is in the mapping table (in step S251). If the MAC address of the old server 200 is in the mapping table, the old server 200 is found and the process then proceeds to step S261. If the MAC address of the old server 200 is not in the mapping table, the old server 200 is not found and the process then ends.

So far, the description is given on the IP address and the process in which the new server 300 identifies and communicates with the old server 200. More specifically, just physically identifying the computer constituting the old server 200 by the new server 300 is not enough to perform communication at an application level. Therefore, it is necessary to identify the old server 200 from a plurality of services executed on the computer constituting the server. In order to identify the service, a port is usually used in addition to an IP address. A port is associated with a service, and specifying a port means specifying the service of the license server 100. As a consequence, when the port of the license server 100 is "50001", the new server 300 specifies the port "50001" as well as the IP address, thereby being reachable to the old server 200. Here, when the old server 200 has not been launched on the computer constituting the old server 200 as a service, no interface for the pertinent port is prepared and the new server 300 cannot communicate with the old server 200.

Thus, specifying a port as well as an IP address enables communication with a specific server on the computer identified by the IP address. According to the first embodiment, the description is given of the case of implementing the license server 100 in conformity with TCP/IP. It is just technological common knowledge for persons skilled in the art that when implementing the license server 100 with other communication protocols, the license server 100 should be implemented in conformity with the other communication protocols and platforms.

In addition, RARP (Reverse Address Resolution Protocol) may be used in place of PING to obtain an IP address.

Figure 8:
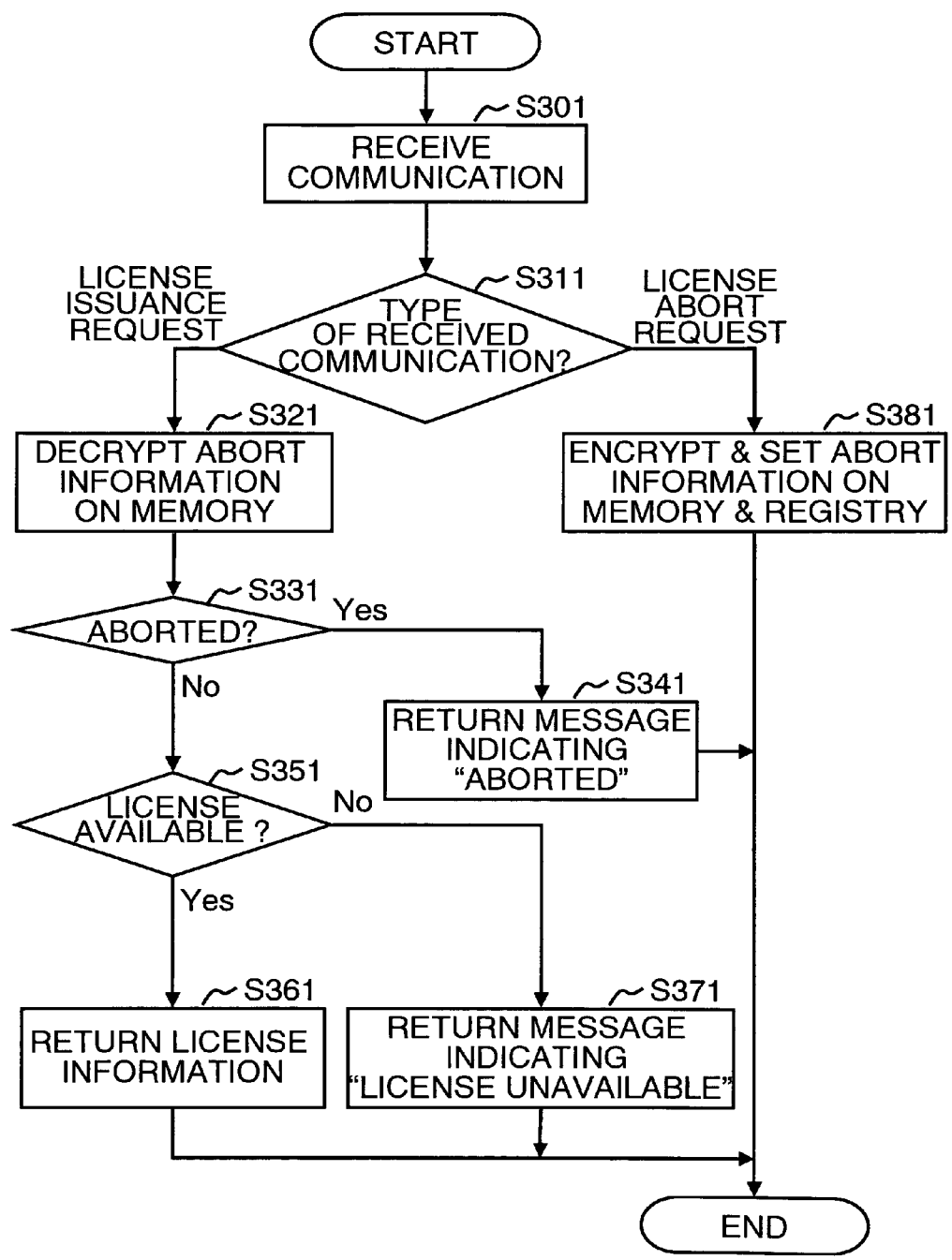
FIG. 8 is a flowchart of a process upon receiving information in an old server according to a first embodiment of the present invention.

FIG. 8 is a flowchart of a process upon receiving information in an old server according to the first embodiment.

The old server 200 receives information from the new server 300 or a client 400 (in step S301), and determines the type of the received information (in step S311). When it is determined that the received information is a license abort request, the old server 200 encrypts the abort information and sets the encrypted abort information to the main memory and the registry (in step S381), and ends the process for receiving the license abort request.

On the other hand, when it is determined that the received information is a license issuance request, the old server 200 decrypts the abort information on the main memory (in step S321).

Subsequently, the execution limiter 117 of the old server 200 determines whether or not the license for execution of the software specified in the license issuance request has been aborted in accordance with the abort information (in step S331). When determining that the license has been aborted, the old server 200 transmits to the client a message indicating that the license of the pertinent software is aborted (in step S341). On the other hand, when it is determined that the license has not been aborted, the availability determiner 114 of the old license server 200 checks availability of the license for the software specified in the license issuance request (in step S351). When the license is available, the request responder 112 of the old server 200 transmits the license information to the client 400 that has transmitted the license issuance request (in step S361), and ends the process for the client that has transmitted the license issuance request.

As a consequence thereof, the client 400 that has received the license information enters an operation state in which the software specified in the license issuance request can be executed. On the other hand, when the license is not available, the old server 200 transmits a message indicating that the license is not available (in step S371), and ends the process for the client that has transmitted the license issuance request. The client 400 that has received the message displays the message on the display.

Thus, in the software execution management system according to the first embodiment, upon replacing the old server 200 with the new server 300, the new server 300 not only executes the process in response to the license issuance request on the basis of the license ID but transmits the abort information to the old server 200 to make the old server 200 receive the abort information and do not execute the process in response to the license issuance request in the old server 200. Therefore, it is possible to prevent the software from being executed by clients over the licensed number even if the old server 200 and the new server 300 coexist.

Second Embodiment

FIG. 9 is a block diagram illustrating details of a license server according to the second embodiment.

The software execution management system according to the second embodiment has the same structure as that according to the first embodiment, wherein the license server 100 further includes: a setup information transmitter 121; setup information receiver 122; and an access information renewal signal transmitter 123.

Upon transmitting the invalidation signal that limits the license determination process detected by the invalid license detector 115, the setup information transmitter 121 transmits setup information on the access to another available request receiver 111.

Upon receiving the invalidation signal, the setup information receiver 122 receives the setup information from the setup information transmitter 121.

After receiving the invalidation signal, when the request receiver 111 receives a request for executing the license determination process from a client 400, the access information renewal signal transmitter 123 transmits, to the client, an access information renewal signal instructing re-transmission of a request for processing to the other available request receiver 111 specified in the setup information received by the setup information receiver 122.

FIG. 3C shows a data structure of access information transmitted from the old server 200 to the client 400 who has requested. The access information includes License Abort Flag indicating that execution of the software is not permitted, Host Name of Available License Server, and IP Address of Available License Server.

Figure 10A:
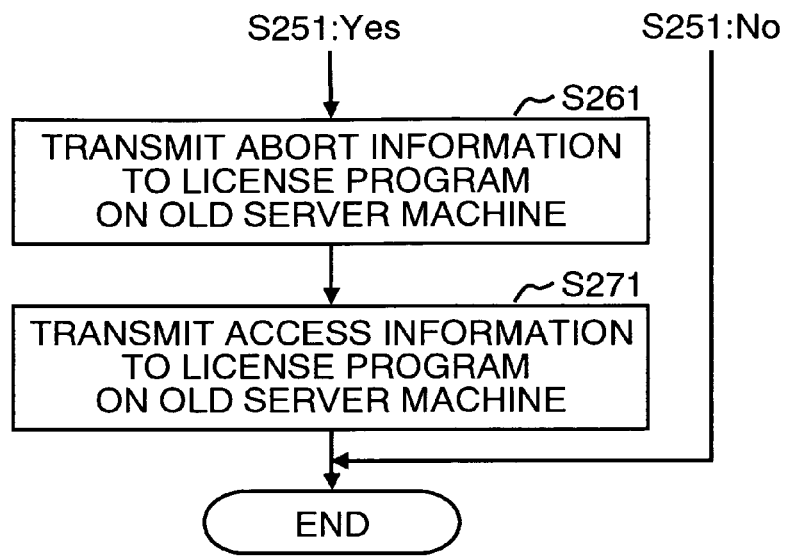
FIGS. 10A and 10B are diagrams illustrating relevant parts of flowcharts shown in FIGS. 7 and 8 upon reflecting a process on access information according to a second embodiment.
Figure 10B:
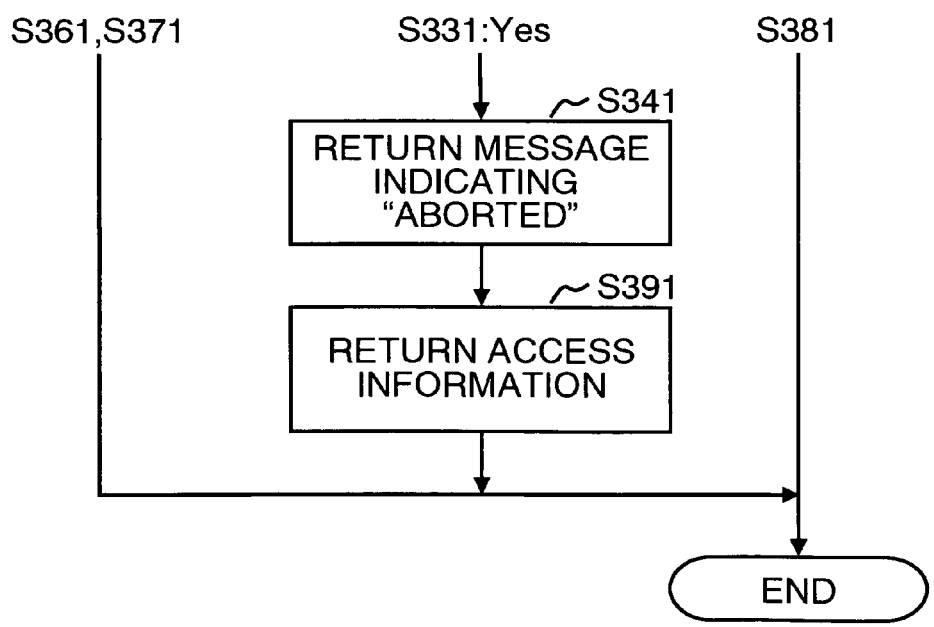

FIGS. 10A and 10B are diagrams illustrating relevant parts of flowcharts shown in FIGS. 7 and 8 upon reflecting a process on access information according to a second embodiment.

As shown in FIG. 10A, in the abort information transmission process upon reflecting the process on access information, after step S261, the new server 300 (setup information transmitter 121) transmits the access information to the old server 200 (setup information receiver 122) (in step S271).

As shown in FIG. 10B, in the process upon receiving information in the case of reflecting the process of access information, after step S341, the old server 200 transmits the access information received from the new server 300 to the client 400 that has requested license issuance (in step S391). Further, the client 400 that has received the access information extracts an IP address of the available license server 100, and requests for license issuance to the license server 100 identified by the extracted IP address. Herein, the license server 100 is usually the new server 300.

Thus, in the software execution management system according to the second embodiment, in addition to the software execution management system according to the first embodiment, the old server 200 transmits information on the new server 300 that can issue a license to the client 400. As a consequence, the license issuance can be requested to the new server 300 as an available license server 100 without changing by the user of the client 400 the IP address of the computer constituting the old server 200 into the IP address of the computer constituting the new server 300. In particular, when the setup information of the client 400 is automatically changed to the IP address of the available license server 100 specified in the access information from the IP address of the old server 200, the next license issuance can be requested to the available license server 100 from the beginning.

Other Embodiments

[Plural Old Servers and One New Server]

As shown in the license ID of FIG. 3A, upon shifting a plurality of old servers 200 to one new server 300, the number of the old servers 200 is put into Number of Registered Old Servers and the MAC addresses of the computer constituting each of the old servers 200 are further put into MAC Addresses of Old Servers, and the new server 300 whose license registration process has ended thus sequentially performs the abort information transmission process for every old server 200.

Here, upon registering the license ID, at least to the registry, in addition to the data structure of license ID shown in FIG. 3A, Abort Information Transmitted Flag indicating whether the abort information has already transmitted or not may preferably be attached for each old server (refer to FIG. 11A).

[One Old Server and Plural New Servers]

Upon shifting from one old server 200 to a plurality of new servers 300, in order to prevent every new server 300 from executing the abort information transmission process according to the first embodiment, as shown in FIG. 11B, the MAC addresses of all the new servers 300 may be put into MAC Addresses of Machines for Registration and Abort Information Transmitting Flag may be separately provided. This allows only at least one new server 300 which have set Abort Information Transmitting Flag can execute the abort information transmission process. As a consequence, it is possible to prevent all the new servers 300 from redundantly performing unnecessary abort information transmission process to an old server 200. In particular, it is necessary to perform process for obtaining an IP address from the MAC address and further obtain the IP address of the old server 200 from the mapping table. Therefore, the preventing methods shown here are extremely effective.

As a similar preventing method, as shown in FIG. 12A, the license ID may have at least MAC Addresses of Machines for Registration so that the MAC addresses (alternatively, IP addresses may also be used) of the new servers 300 are transmitted to the old server 200. Upon receiving the abort information, the old server 200 may transmit to the new servers 300 notification that the abort information transmission process has been already performed.

[Plural Old Servers and Plural New Servers]

Also upon shifting from a plurality of old servers 200 to a plurality of new servers 300, it is possible to limit the new servers 300 that execute the abort information transmission process by using the process described in [One Old Server and Plural New Servers].

As well as MAC Addresses of Machines for Registration, as shown in FIG. 12B, Abort Information Transmission ID may be provided for each MAC address. An ID number of the old server 200 surrounded by an elliptical dotted frame in MAC Addresses of Old Servers may be put into Abort Information Transmission ID. That is, by associating ID of the new server 300 with ID of the old server 200, the old server 200 to which the new server 300 transmits abort information may be limited so as to prevent execution of unnecessary process.

[Broadcast of a Search Packet]

According to the above described embodiments, an MAC address, as being information that cannot be edited later, is used as data to be put into the license ID. However, the process for obtaining the IP address from the MAC address is troublesome, and the number of PING times can be greatly increased depending on the network address of the computer constituting the new server 300. For example, all IP addresses on the network may be subjected to PING.

For which, such a configuration may be used that when the new server 300 broadcasts a search packet (in a data structure including information identifiable the packet as a search packet in the software management system and an address of the new server 300 as the transmission source), the old server transmits to the new server 300 a reply packet (in a data structure including at least the IP address of the old server 200, preferably including the MAC address) for the search packet. This allows the new server 300 to greatly save trouble in searching for the old server 200.

[Examples Other than License Server]

Figure 13:
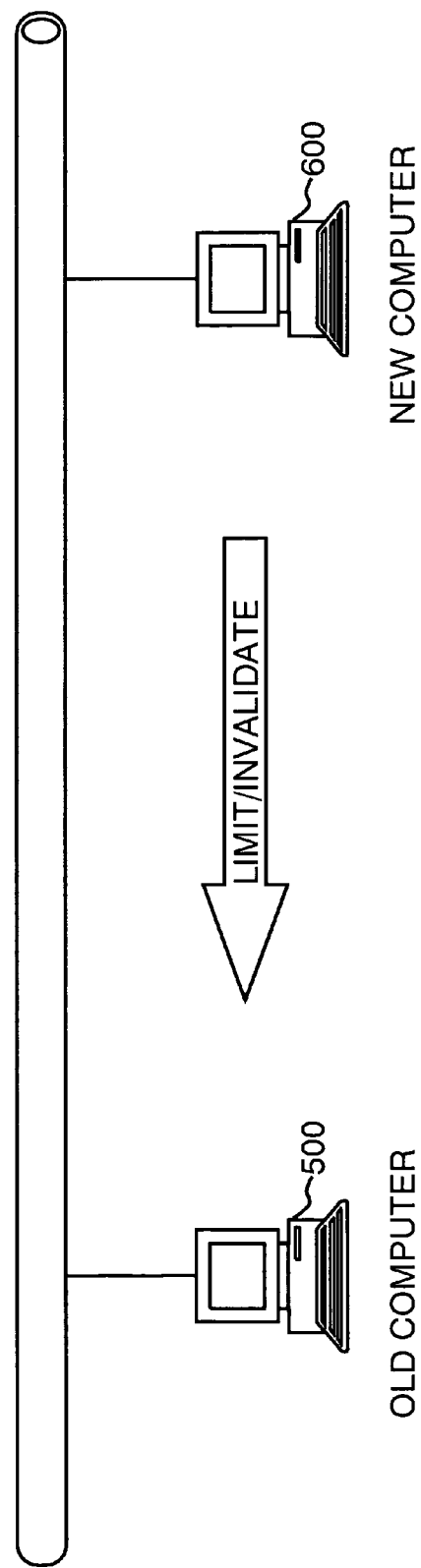
FIG. 13 is a diagram illustrating an entire system structure of a software execution management system according to another embodiment of the present invention.

According to the above described embodiments, a license server 100 is taken as a software execution management apparatus and the entire system is taken as a software execution management system. However, as shown in FIG. 13, it is also applicable to architectures other than a server-client architecture. An old computer 500 and a new computer 600 are software execution management apparatuses, respectively, and include the license information storage 113, the availability determiner 114, the invalid license detector 115, the invalidation signal transmitter 116, the execution limiter 117, and the license canceller 118 from among the components of the license server 100. Suppose a situation where a user uses software A on the old computer 500 and decides to use the software A on the new computer 600 because the software A is CAD software and requires high throughput. The new computer 600 is installed with the software A and a license ID. In the license ID, the MAC address of the new computer 600 is put into MAC Address of Machine for Registration, information for identifying the software A and "1" as the limited number for use are put into License Information to be Provided, "1" is put into Number of Registered Old Computers, and the MAC address of the old computer 500 is put into MAC Address of Old Computer.

As a consequence, the license registration process in the first embodiment is performed wherein the first license information and the second license information are stored in the new computer. The process in new server in the first embodiment is performed wherein the abort information is transmitted from the new computer 600 to the old computer 500. Further, the process in old server in the first embodiment is performed wherein the old computer 500 sets the abort information. Therefore, although the user can use the software A on the new computer 600, he/she cannot use the software A on the old computer 500.

In other words, the user needs to install the license ID so as to use the software A on the new computer 600. Installation of the license ID forms a system for automatically limiting the use on the old computer 500.

Although the present invention is described according to the above described embodiments, the technological scope of the present invention is not limited to that given in the embodiments and the embodiments may be variously changed or improved. The embodiments obtained by such changes and improvements may be included in the technical scope of the present invention. This is obvious from CLAIMS and Means for Solving the Problems.

What is claimed is:

1. A software execution management apparatus communicably connectable to a client, the software execution management apparatus being capable of acting as a first server managing software execution, the first server being replaced by a second server, the software execution management apparatus being capable of acting as a third server which replaces a fourth server managing software execution, the software execution management apparatus comprising:

a license information storage for storing first license information and second license information, the first license information relating permission for executing a process for permitting execution of software, the second license information including an identification code for identifying a license to be invalidated; and a computer processor to execute:

determining, in accordance with the first license information, availability of the process for permitting execution of the software, detecting when the software execution management apparatus acts as the third server, in accordance with the second license information, the fourth server which is still executing the process for permitting execution of the software, the software being permitted to be executed by the client in accordance with the license to be invalidated according to the second license information, transmitting when the software execution management apparatus acts as the third server, to the detected fourth server a first invalidation signal according to the second license information for limiting the process of the fourth server for permitting execution of the software by the client, and limiting when the software execution management apparatus acts as the first server, the process for permitting execution of the software by the client, regardless of the first license information, upon receiving a second invalidation signal from the second server.

2. The software execution management apparatus of claim 1, the computer processor to execute registering when the software execution management apparatus acts as the first server, information for invalidating the first license information stored in the license information storage upon receiving the first invalidation signal from the second server.

3. The software execution management apparatus of claim 1, the computer processor to further execute:

receiving from the client a request for executing the process for permitting execution of the software, and executing the process for permitting execution of the software upon receiving from the client the request for executing the process for permitting execution of the software and returning a result thereof to the client.

4. The software execution management apparatus of claim 1, the computer processor to further execute:

transmitting when the software execution management apparatus acts as the third server, to the fourth server, upon transmitting the first invalidation signal for limiting the process for permitting execution of the software, first setup information relating to an access to the software execution management apparatus, receiving when the software execution management apparatus acts as the first server, second setup information from the second server upon receiving the second invalidation signal from the second server, the second setup information relating to an access to the second server, and transmitting when the software execution management apparatus acts as the first server, to the client an access information renewal signal for instructing retransmission of a request for executing the process for permitting execution of the software to the second server specified in the second setup information received from the second server, upon receiving the request for executing the process for permitting execution of the software from the client after receiving the second invalidation signal from the second server.

5. A software execution management method executed by a first computer managing software execution and a second computer replacing the first computer, the software execution management method comprising:

determining, by the first computer, availability of a process for permitting execution of software by a client in accordance with first license information stored in a storage area, the first license information relating to permission for executing the process for permitting execution of the software;

detecting, by the second computer, the first computer in accordance with the second license information stored in a storage area, the first computer being still executing the process for permitting execution of the software, the second license information including an identification code for identifying a license to be invalidated, the software being permitted to be executed by the client in accordance with the license to be invalidated according to the second license information, transmitting, by the second computer, an invalidation signal to the detected first computer for limiting execution of the process of the first computer to permit execution of the software by the client, in accordance with the second license information; and limiting, by the first computer, execution of the process for permitting execution of the software by the client, regardless of the first license information, upon receiving the invalidation signal.

6. The software execution management method of claim 5, further comprising:

registering, by the first computer, information for invalidating the first license information stored in the storage area, upon receiving the invalidation signal.

7. The software execution management method of claim 5, further comprising:

receiving, by the first computer, a request for executing the process for permitting execution of the software from the client; and executing the process for permitting execution of the software upon receiving the request for executing the process for permitting execution of the software from the client and returning, by the first computer, a result thereof to the client.

8. The software execution management method of claim 5, further comprising:

transmitting, by the second computer, setup information relating to an access to the second computer upon transmitting the invalidation signal for limiting the process for permitting execution of the software;

receiving, by the first computer, the setup information from the second computer upon receiving the invalidation signal; and transmitting to the client, by the first computer, an access information renewal signal for instructing retransmission of A request for executing the process for permitting execution of the software to the second computer specified in the setup information received from the second computer, upon receiving the request for executing the process for permitting execution of the software from the client after receiving the invalidation signal.

9. A non-transitory computer-readable medium storing a program that causes a computer that is communicably connectable to a client to execute software execution management, the computer being capable of acting as a first server managing software execution, the first server being replaced by a second server, the computer being capable of acting as a third server replacing a fourth server managing software execution, the software execution management comprising:

storing first license information and second license information, the first license information relating to permission for executing a process for permitting execution of software, the second license information including an identification code for identifying a license to be invalidated;

determining, in accordance with the first license information, availability of the process for permitting execution of the software;

detecting when the computer acts as a third server, in accordance with the second license information, the fourth server which is still executing the process for permitting execution of the software, the software being permitted to be executed by the client in accordance with the license to be invalidated according to the second license information;

transmitting when the computer acts as the third server, to the detected fourth server a first invalidation signal according to the second license information for limiting the process of the fourth server for permitting execution of the software by the client; and limiting when the computer acts as the first server, the process for permitting execution of the software by the client, regardless of the first license information, upon receiving a second invalidation signal from the second server.

10. The non-transitory computer-readable medium of claim 9, the software execution management further comprising:

registering when the computer acts as the first server, the computer acts as the first server, information for invalidating the first license information in the license information stored upon receiving the first invalidation signal from the second server.

11. The non-transitory computer-readable medium of claim 9, the software execution management further comprising:

receiving from the client a request for executing the process for permitting execution of the software; and executing the process for permitting execution of the software upon receiving from the client the request for executing the process for permitting execution of software and returning a result thereof to the client.

12. The non-transitory computer-readable medium of claim 9, the software execution management further comprising:

transmitting when the computer acts as the third server, to the fourth server, upon transmitting the first invalidation signal for limiting the process for permitting execution of the software, first setup information relating to an access to the software execution management apparatus;

receiving the computer acts as the first server, second setup information from the second server upon receiving the second invalidation signal from the second server, the second setup information; and transmitting when the computer acts as the first server, to the client an access information renewal signal for instructing retransmission of a request for executing the process for permitting execution of the software to the second server specified in the second setup information received from the second server, upon receiving the request for executing the process for permitting execution of the software from the client after receiving the second invalidation signal from the second server.

* * * * *

UNITED STATES PATENT AND TRADEMARK OFFICE
CERTIFICATE OF CORRECTION

PATENT NO.         : 8,712,917 B2                                    Page 1 of 1
APPLICATION NO.    : 12/215415
DATED              : April 29, 2014
INVENTOR(S)        : Fujimura It is certified that error appears in the above-identified patent and that said Letters Patent is hereby corrected as shown below:

In the Claims

Column 14, Line 51, Claim 8, delete "A" and insert -- a --, therefor.

Signed and Sealed this
Twenty-ninth Day of July, 2014

Michelle K. Lee
*Deputy Director of the United States Patent and Trademark Office*